No. 640,734. Patented Jan. 9, 1900.
G. L. BEADELL.
GRAIN CLEANER.
(Application filed Oct. 21, 1898.)
(No Model.)
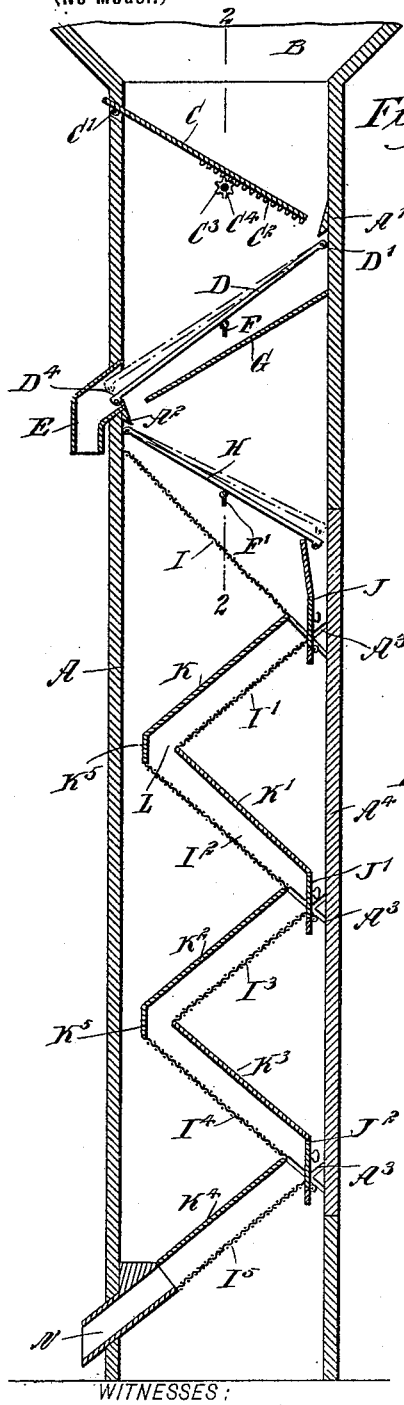
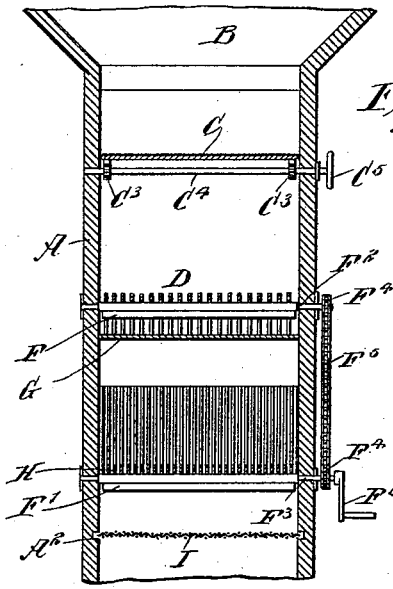
WITNESSES:
Edward Thorpe
INVENTOR
G. L. Beadell
BY
ATTORNEYS.

UNITED STATES PATENT OFFICE.

GEORGE LAWRENCE BEADELL, OF CHICAGO, ILLINOIS.

GRAIN-CLEANER.

SPECIFICATION forming part of Letters Patent No. 640,734, dated January 9, 1900.

Application filed October 21, 1898. Serial No. 694,155. (No model.)

*To all whom it may concern:*

Be it known that I, GEORGE LAWRENCE BEADELL, of Chicago, in the county of Cook and State of Illinois, have invented a new and Improved Grain-Cleaner, of which the following is a full, clear, and exact description.

The object of the invention is to provide a new and improved grain-cleaner which is suitable and durable in construction, very effective in operation, and arranged to readily and thoroughly separate large matters—such as corncobs, rocks, pieces of wood, weeds, and coarse straw—from the grain and seeds, then separate one kind of grain or seed from another, and finally separate small shriveled kernels of grain from the perfect plump kernels and graduate the latter as to size.

The invention consists of novel features and parts and combinations of the same, as will be fully described hereinafter and then pointed out in the claim.

Reference is to be had to the accompanying drawings, forming a part of this specification, in which similar characters of reference indicate corresponding parts in all the figures.

Figure 1 is a sectional side elevation of the improvement. Fig. 2 is a transverse section of the same on the line 2 2 in Fig. 1. Fig. 3 is an enlarged plan view of the rougher, and Fig. 4 is a similar view of part of one of the interchangeable sieves or screens.

The improved grain-cleaner is provided with a vertically-disposed box or casing A, supporting at its upper end a hopper B, through which the grain is introduced into the casing A, the grain passing first upon a slide C, arranged transversely in an inclined position and mounted to move to increase or decrease the opening between the lower end of the slide and the rear side of the casing, so as to feed the desired amount of grain down upon the rougher D. The upper end of the slide C extends through an opening in the front of the casing A, and said upper end of the slide rests on a roller C' for insuring an easy movement of the slide when adjusting the same for feeding more or less grain to the rougher D.

In order to move the slide, I provide the under side thereof with racks $C^2$, in mesh with pinions $C^3$, secured on a transversely-extending shaft $C^4$, journaled in suitable bearings in the sides of the casing, a hand-wheel $C^5$ being secured on one outer end of the shaft to permit the operator to turn the shaft and cause the pinions to move the racks $C^2$, and consequently the slide C, in the desired direction for the purpose mentioned.

The rougher D is inclined downwardly from the rear or back of the box to the front thereof, and said rougher is provided at its upper end with a rod D', fitted in the sides of the box A and forming a fulcrum for the rougher D to swing upon, the desired motion being given to the rougher by a revolving wing F, hereinafter more fully described. The rougher D is further provided with spaced bars or rods $D^2$, extending from the fulcrum-rod D' to a rod $D^4$ on the lower ends of the bars $D^2$, the latter being spaced at both rods D' and $D^4$ by suitable washers $D^3$ and $D^5$, as is plainly indicated in Fig. 3. The lower end of the rougher D extends into a spout E, leading from the front of the box or casing A, and when the machine is in operation and the material passes upon said rougher D then large matters—such as corncobs, rocks, pieces of wood, weeds, and coarse straw—readily pass down the bars $D^2$ into the spout E, to be discharged through the same to the outside of the machine, the grain passing between the bars $D^2$ down upon an inclined bottom G, extending from one side of the box to the other and from the back of the box downward to within a short distance of the front thereof, as is plainly shown in Fig. 1. The fulcrum D' of the rougher is protected by an overhanging bead A', attached to the inner face of the back of the box A.

The lower end of the bottom G discharges the material upon a separator H, similar in construction to the rougher D, the only difference being that the bars for forming the separator are spaced a less distance apart than the bars $D^2$ above described and shown in Fig. 3. The upper end of said separator H is pivoted to the front of the box A and is protected by a bead $A^2$, similar to the bead A', as shown in Fig. 1. The separator H extends downwardly, the lower end reaching within a short distance of the back of the box A, and said separator receives a swinging motion from a wing F', similar to the wing F and rotating with the same. For this purpose the wings F and F' are secured on shafts $F^2$ and $F^3$, journaled in the sides of the box A, and the outer ends of said shafts are provided with sprocket-wheels $F^4$, over which passes a sprocket-chain $F^5$, so that when one shaft is rotated the other shaft rotates with it to impart a rotary motion to the wings F and F' and swing the rougher D and the separator H simultaneously up and down. A crank-arm $F^6$ may be provided for turning one of the shafts $F^3$ $F^4$ by hand; but pulleys and belts may be employed for the purpose, if desired.

The separator H serves to separate one kind of grain or seed from another—that is, the undesirable grain or seed passes over the lower end of the separator and drops down in the box A, while the desirable grain passes through the bars of the separator and falls upon a sieve I, inclined downwardly from the front of the box to within a suitable distance of a deflector J, secured transversely in the sides of the box a suitable distance from the back thereof, so as to form a channel between the back and the deflector for the passage of the material leaving the lower end of the separator H.

The sieve I serves to separate small and shriveled grain from the plump kernels, and also allows the fine matter, such as dirt, to pass through the meshes of the sieve upon an inclined bottom K, extending from the lower end of the sieve forwardly and downwardly to within a short distance of the front of the box, so that the separated material traveling down the bottom K finally drops off the same and down into the box A to be removed from the lower end thereof with other refuse. The deflector J causes the grain to pass upon a second sieve I', inclined downwardly and forwardly to allow of further separation of the undesirable matters from the grain, said undesirable matters passing through the screen upon an inclined bottom K', terminating at its lower end upon a deflector J', similar to the deflector J. The grain passing down the screen I' passes upon another screen $I^2$ below and parallel to the bottom K' and connecting at its lower end with an inclined bottom $K^2$, parallel to and above a screen $I^3$, extending downwardly from the deflector J'. Another screen $I^4$ receives the material from the screen $I^3$, and the material passing through the meshes of the screen $I^3$ drops upon an inclined bottom $K^3$, parallel to the screen $I^4$ and above the same, and terminating at a deflector $J^2$ similar to the deflector J'. Another bottom $K^4$ is under the screen $I^4$, and a screen $I^5$ is under the bottom $K^4$ and extends downwardly and forwardly from the deflector $J^2$.

It will be seen by the arrangement described that the bottoms K, K', $K^2$, $K^3$, and $K^4$ and the screens I', $I^2$, $I^3$, $I^4$, and $I^5$ form a zigzag channel L, through which the material travels, to insure a gradual separation of the undesirable material from the plump and perfect kernels of the grain, the latter being finally discharged from the lower end of the screen $I^5$ into a chute N, extending from the front of the box A. The lower ends of the bottoms K and $K^2$ are provided with downwardly-extending flanges $K^5$, which form deflectors for readily directing the material to the next following screens $I^2$ and $I^4$, respectively, the upper ends of which screens abut on the lower edges of said flanges.

The several screens from I' to $I^5$ are fitted to slide in grooves $A^3$, formed on the inner face of the sides of the box A, so that the said screens can be removed and interchanged for screens of different-sized mesh, according to the nature of the material under treatment. Access is had to said screens, for the purpose mentioned, by the removable portion $A^4$ of the back of the box A and the removable deflectors J, J', and $J^2$.

It will be seen by the arrangement described that the material passed into the hopper B is fed in desired quantities by the slide C upon the rougher D, on which the large matter is separated from the material and discharged at the outside of the machine, while the material passes upon the separator H, on which one kind of grain or seed is separated from the other, the undesirable part being discharged into the box and dropping down the same to a place of discharge, while the grain passing through the bars of the separator passes upon the screen I and then passes successively to the screens I' $I^2$ $I^3$ $I^4$ $I^5$ for a thorough separation of other foreign substances and small shriveled kernels of grain.

By having the bottoms K K' $K^2$ $K^3$ $K^4$ arranged parallel to and in close proximity to the corresponding screens I' $I^2$ $I^3$ $I^4$ $I^5$, I provide a comparatively small passage or channel for the grain, thereby insuring a thorough rubbing of the kernels on each other and a proper scouring thereof.

It is understood that by imparting a swinging motion to the rougher D and the separator H a rapid separation of the material passing over said rougher and separator is obtained.

By using different-sized washers $D^3$ $D^5$ in the construction of the rougher D and separator H, I am enabled to space the bars $D^2$ according to the nature of the grain under treatment. Furthermore, the construction of the rougher and separator permits their convenient removal from the casing whenever it is desired to change the spaced bars $D^2$, as above mentioned.

Having thus described my invention, I claim as new and desire to secure by Letters Patent—

A grain-cleaner comprising a box or casing having a hopper at its upper end, a hinged rougher in said casing and extending in an inclined position, the said rougher discharging the coarse material passing over the same through an opening in the casing to the outside thereof, a hinged separator below said rougher and inclined in an opposite direction, the said separator receiving the material passing through the rougher, means for imparting a swinging motion to the rougher and separator, screens arranged in zigzag manner below said separator and receiving the material passing through the same, and deflectors spaced from the wall of the casing for deflecting the material from one screen to the other, the material passing from the lower end of the separator being discharged between the deflectors and the wall of the casing, substantially as described.

GEORGE LAWRENCE BEADELL.

Witnesses:
 CHARLES ELANDT,
 HARRY D. ROBINSON.